(12) United States Patent
Lovell et al.

(10) Patent No.: US 12,489,390 B1
(45) Date of Patent: Dec. 2, 2025

(54) SOLAR POWER SYSTEM

(71) Applicant: Solar APU Systems LLC, Valdosta, GA (US)

(72) Inventors: William Roderick Lovell, Flowery Branch, GA (US); Matthew Richard Hernandez, Dawsonville, GA (US)

( * ) Notice: Subject to any disclaimer, the term of this patent is extended or adjusted under 35 U.S.C. 154(b) by 0 days.

(21) Appl. No.: 18/583,489

(22) Filed: Feb. 21, 2024

Related U.S. Application Data

(60) Provisional application No. 63/447,047, filed on Feb. 21, 2023.

(51) Int. Cl.
| | |
|---|---|
| *H02S 10/40* | (2014.01) |
| *B60H 1/00* | (2006.01) |
| *B60R 16/033* | (2006.01) |
| *H01M 10/0525* | (2010.01) |
| *H01M 10/42* | (2006.01) |
| *H01M 10/44* | (2006.01) |
| *H01M 10/46* | (2006.01) |
| *H02J 7/35* | (2006.01) |
| *H02S 10/10* | (2014.01) |
| *H02S 10/20* | (2014.01) |
| *H02S 40/32* | (2014.01) |

(52) U.S. Cl.
CPC ......... *H02S 10/40* (2014.12); *B60H 1/00428* (2013.01); *B60R 16/033* (2013.01); *H01M 10/0525* (2013.01); *H01M 10/425* (2013.01); *H01M 10/441* (2013.01); *H01M 10/46* (2013.01); *H02J 7/35* (2013.01); *H02S 10/10* (2014.12); *H02S 10/20* (2014.12); *H02S 40/32* (2014.12); *H01M 2220/20* (2013.01)

(58) Field of Classification Search
CPC .......... H02S 10/40; H02S 10/10; H02S 10/20; H02S 40/32; B60H 1/00; B60H 1/00428; B60R 16/03; B60R 16/033; H01M 10/05; H01M 10/0525; H01M 10/425; H01M 10/441; H01M 10/46; H01M 2220/20; H01M 10/42; H01M 10/44; H02J 7/35
See application file for complete search history.

(56) References Cited

FOREIGN PATENT DOCUMENTS

WO WO-2020236955 A1 * 11/2020 ......... B60H 1/00428

* cited by examiner

*Primary Examiner* — Robert L Deberadinis
(74) *Attorney, Agent, or Firm* — Charlena Thorpe, Esq.; Incorporating Innovation LLC (57) ABSTRACT

Implementations of a solar power system comprising one or more solar panels, a solar controller, a battery bank, and an HVAC (heating, ventilation, and air conditioning) controller, and in some implementations, further comprising a venting system. In some implementations, a method of using the solar power system comprises charging the battery bank with the solar panels mounted on a truck for usage of the truck HVAC system to provide climate control to the truck cab/sleeper compartment without running the truck engine for power, thereby eliminating engine idle time while using the truck HVAC system.

20 Claims, 9 Drawing Sheets

SOLAR POWER SYSTEM

CROSS REFERENCE TO RELATED APPLICATION

This application claims the benefit of U.S. Patent Application Ser. No. 63/447,047, which was filed on Feb. 21, 2023, and is incorporated herein by reference in its entirety.

TECHNICAL FIELD

This disclosure relates to implementations of a solar power system for heating and cooling a cab/sleeper compartment of a truck without using the engine to power a heating or HVAC system (and/or other components of the truck) thereby eliminating engine idle time.

BACKGROUND

Figure 1:
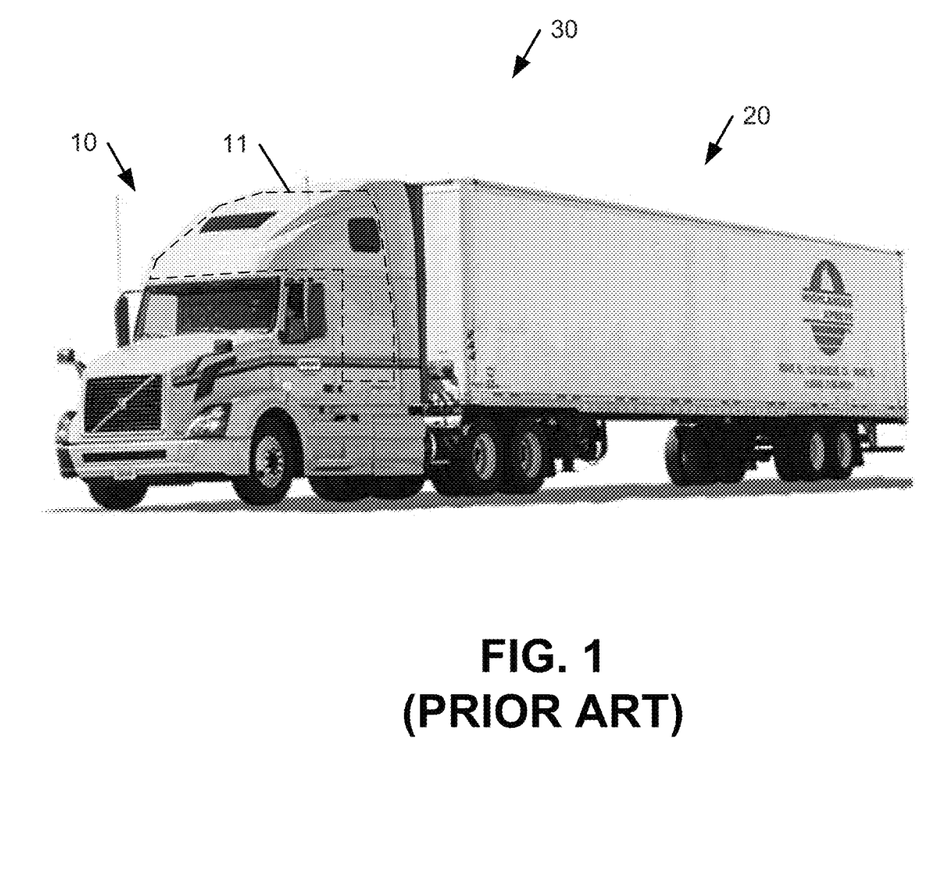
FIG. 1 illustrates an example existing tractor trailer that includes a truck/tractor and a trailer.

FIG. 1 illustrates a truck tractor (or a truck or a tractor) and a semitrailer (or a trailer), which connected together form a tractor trailer (or a semi-truck) in which the motorized truck tows or hauls the trailer. The truck includes a cab/sleeper compartment (e.g., behind and/or above the driving/passenger compartment) for use by the driver and/or a passenger (e.g., for resting, sleeping, etc.). The truck further includes an HVAC (heating, ventilation, and air conditioning) system for heating and cooling the cab/sleeper compartment that is powered by a battery or the engine of the truck.

Engine idle time is time when the truck is not moving but the engine is running. For example, engine idle time occurs when the engine is used to power the truck HVAC system for heating or cooling while the driver is in the cab/sleeper compartment. Reduction of engine idle time is desirable because it reduces fuel usage, engine wear, and CO2 (carbon dioxide) emissions of the truck, among other advantages/benefits.

In prior art truck systems, the engine charges the battery while the engine is running and the battery powers the HVAC system while the engine is off when the cab/sleeper compartment is used. However, when the battery charge is or eventually becomes low, the engine runs/idles (e.g., by the auto-start system of the truck) to re-charge the battery and power the HVAC system (which usually occurs once or more during a typical rest/sleep period). Thus, the prior art systems do not eliminate engine idle time while providing climate control to the cab/sleeper compartment for keeping the truck driver/passenger comfortable.

DETAILED DESCRIPTION

Implementations of a solar power system are provided. In some implementations, the solar power system comprises one or more solar panels, a solar controller, a battery bank, and an HVAC (heating, ventilation, and air conditioning) controller.

In some implementations, the solar power system may further comprise an inverter. In some implementations, the solar power system may further comprise a generator/alternator. In some implementations, the solar power system may further comprise a venting system.

In some implementations, the solar power system provides for heating and/or cooling a cab/sleeper compartment of a truck without using the engine to power a heating or HVAC (heating, ventilation, and air conditioning) system.

In some implementations, the solar power system further provides power for any other suitable component, amenity, etc. of the truck (such as lighting, communications, accessories, etc. in addition to the HVAC system, i.e. the electrical load of the truck) without using the engine to power these components.

In some implementations, the solar power system helps to eliminate engine idle time (i.e., time the truck is not moving but the engine is running) while providing climate control to the cab/sleeper compartment for keeping the truck driver/passenger comfortable.

In some implementations, the solar power system helps to eliminate engine idle time while further providing power for any other suitable component, amenity, etc. of the truck (such as lighting, communications, accessories, etc. in addition to the HVAC system, i.e. the electrical load of the truck).

In some implementations, the elimination of the overall engine idle time of the truck provided by the solar power system reduces fuel usage, engine wear, and/or CO2 (carbon dioxide) emissions of the truck, among other advantages/benefits.

In some implementations, the solar power system is configured such that the truck engine is not needed to charge the battery bank and the battery bank is capable of providing power for approximately 12 hours (e.g., as much or longer than a typical rest/sleep period). In some implementations, the battery bank may be capable of providing power for more than 12 hours or for less than 12 hours.

In some implementations, the solar power system is further configured such that the solar panels can power the truck HVAC system during the day, daylight, etc. while charging the battery bank and the battery bank can then be used (e.g., at night) for approximately 12 hours (e.g., as much or longer than a typical rest/sleep period) to provide power for any other suitable component, amenity, etc. of the truck (such as lighting, communications, accessories, etc. in addition to the HVAC system, i.e. the electrical load of the truck). In some implementations, the battery bank can be used for more than 12 hours or for less than 12 hours.

In some implementations, the solar power system is configured to use fewer batteries for a longer period of time than prior art systems.

In some implementations, the solar power system may be configured to increase the voltage of power provided for high load components such as the compressor, condenser fan, evaporator fan, etc of the truck. For example, in some implementations, the solar power system may be configured to increase/amplify the voltage from 12 volts to 48 volts.

In some implementations, the solar power system may be configured to increase the voltage of power (such as described above) with a suitable amplifier and/or transformer.

In some implementations, the solar power system may be configured to use reduced amperage, for example by using increased/amplified voltage for components of the truck (such as described above).

In some implementations, the solar power system is portable.

In some implementations, the solar power system is separable from the truck or from systems of the truck.

In some implementations, the solar power system is isolated from the truck.

In some implementations, the solar power system can be used with or retrofitted to any truck.

In some implementations, the solar power system does not include/require an auto-start system of a truck for automatically starting the truck based on the state of charge of the battery bank, such as a low charge while powering the HVAC system of the truck.

In some implementations, the solar power system is uncoupled from the auto-start system of a truck.

Unlike prior art systems, the solar power system of the present disclosure is easily adaptable. The number of solar panels mounted on the truck and/or the number of batteries in the battery bank can be adjusted, for example, to meet the particular needs associated with a route being travelled by the truck and/or the driver's preferences. In some areas travelled, more solar panels may be needed than in other areas travelled. In some areas travelled, more battery capacity may be needed than in other areas travelled. In the solar power system of the present disclosure, the number of panels installed on the truck and/or the number of batteries installed in the battery bank can be easily varied. Prior art systems are rigid and non-adaptable.

In some implementations, a method of using the solar power system comprises charging the battery bank of the solar power system with the solar panels of the solar power system mounted on a truck for night usage (or usage at any other suitable time) of the truck HVAC system to provide climate control to the truck cab/sleeper compartment without running the truck engine for power (thereby eliminating engine idle time while using the truck HVAC system).

FIG. 1 illustrates a truck tractor (or a truck or a tractor) 10 and a semitrailer (or a trailer) 20, which connected together form a tractor trailer (or a semi-truck) 30 in which the motorized truck 10 tows or hauls the trailer 20. The truck 10 includes a cab/sleeper compartment 11 (e.g., behind and/or above the driving/passenger compartment) for use by the driver and/or a passenger (e.g., for resting, sleeping, etc.). The truck 10 further includes an HVAC (heating, ventilation, and air conditioning) system for heating and cooling the cab/sleeper compartment 11 that is powered by a battery or the engine of the truck 10.

Engine idle time is time when the truck 10 is not moving but the engine is running. For example, engine idle time occurs when the engine is used to power the truck 10 HVAC system for heating or cooling while the driver is in the cab/sleeper compartment 11. Reduction of engine idle time is desirable because it reduces fuel usage, engine wear, and $CO_2$ (carbon dioxide) emissions of the truck 10, among other advantages/benefits.

In prior art truck 10 systems, the engine charges the battery while the engine is running and the battery powers the HVAC system while the engine is off when the cab/sleeper compartment 11 is used. However, when the battery charge is or eventually becomes low, the engine runs/idles (e.g., by the auto-start system of the truck 10) to re-charge the battery and power the HVAC system (which usually occurs once or more during a typical rest/sleep period). Thus, the prior art systems do not eliminate engine idle time while providing climate control to the cab/sleeper compartment 11 for keeping the truck 10 driver/passenger comfortable.

Figure 2:
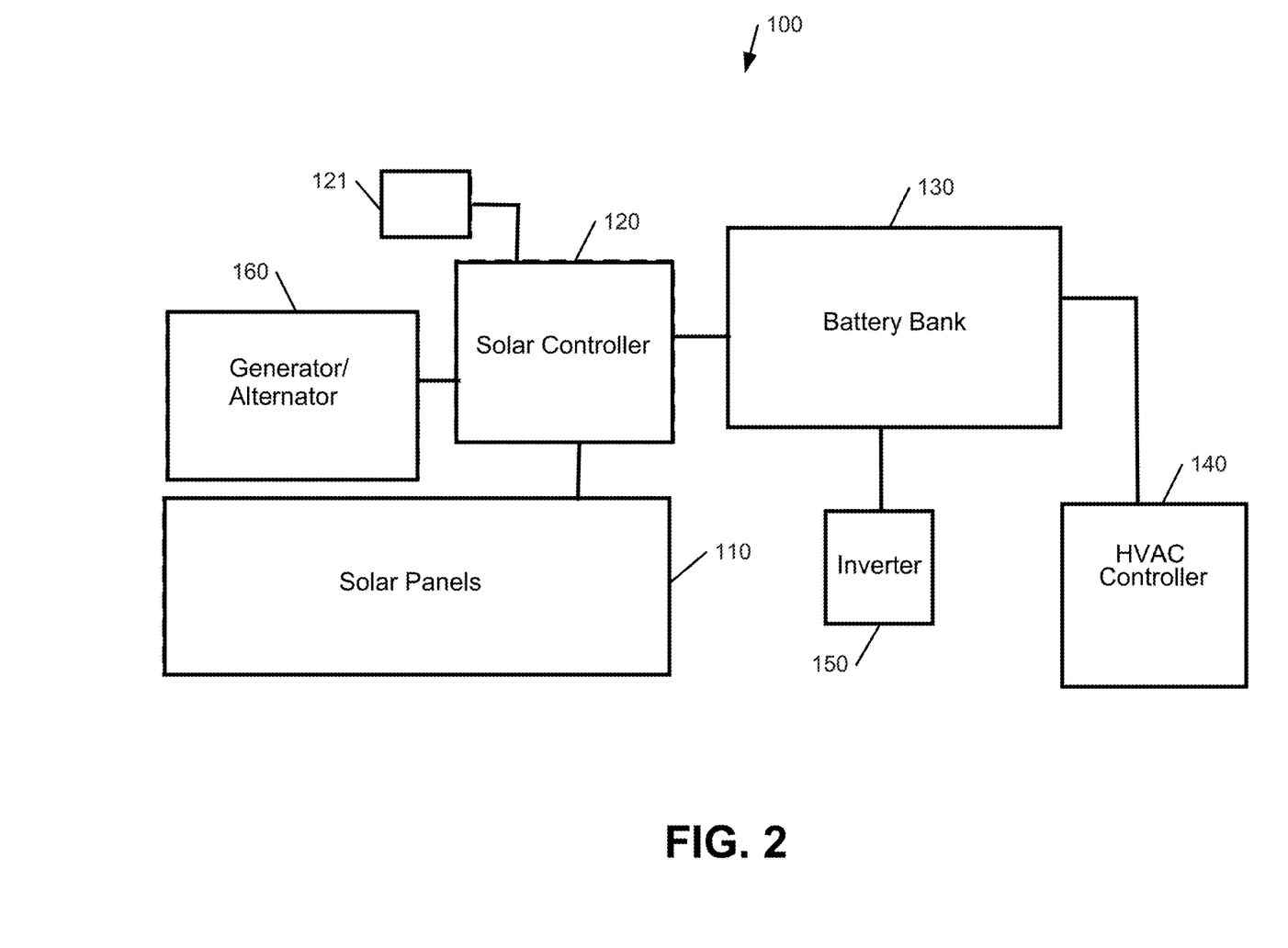
FIG. 2 illustrates an implementation of an example solar power system according to the present disclosure.

FIG. 2 illustrates an implementation of an example solar power system 100 according to the present disclosure. As shown in FIG. 2, in some implementations, the solar power system 100 comprises one or more solar panels 110, a solar controller 120, a battery bank 130, and an HVAC (heating, ventilation, and air conditioning) controller 140. In some implementations, the solar power system 100 may further comprise an inverter 150. In some implementations, the solar power system 100 may further comprise a generator/alternator 160.

Figure 9:
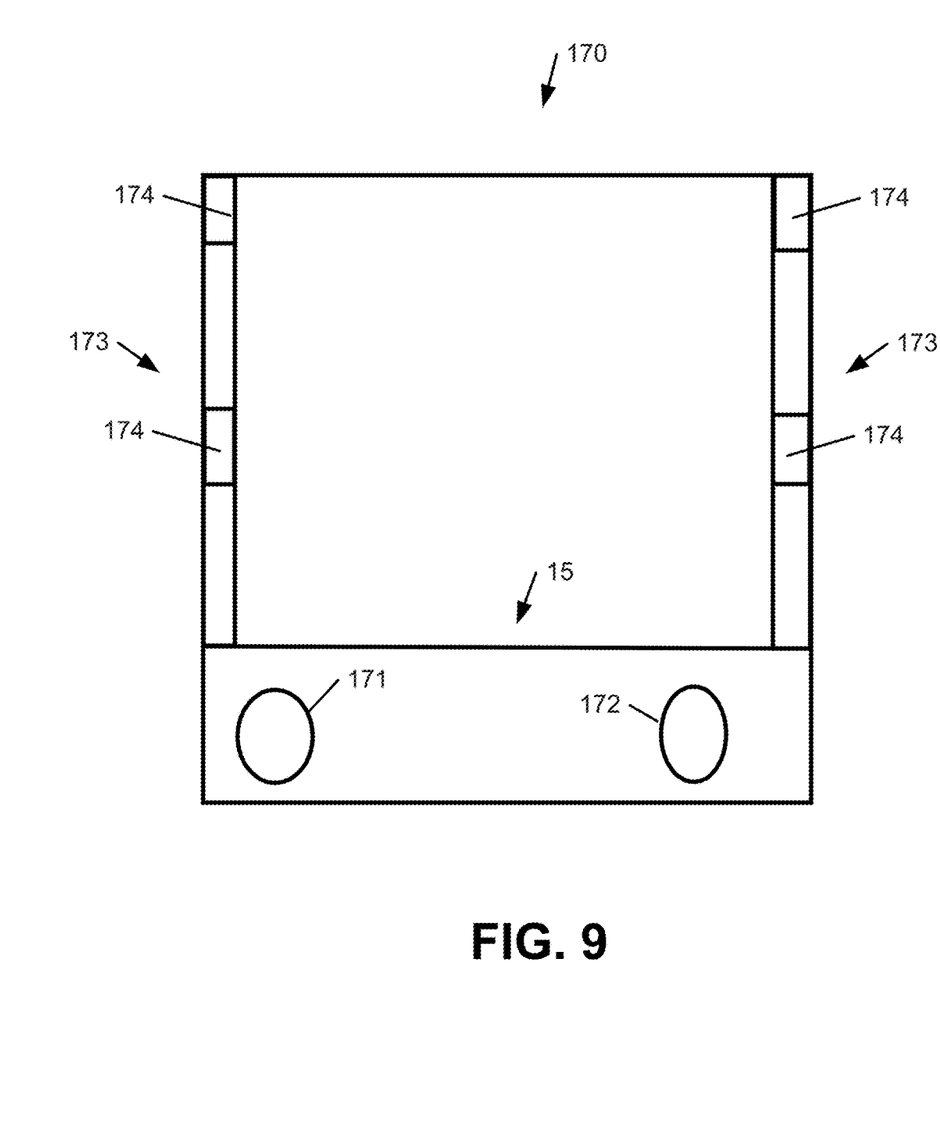
FIG. 9 illustrates an implementation of an example venting system of the solar power system according to the present disclosure.

In some implementations, the solar power system 100 may further comprise a venting system 170 such as shown in FIG. 9.

Figure 3:
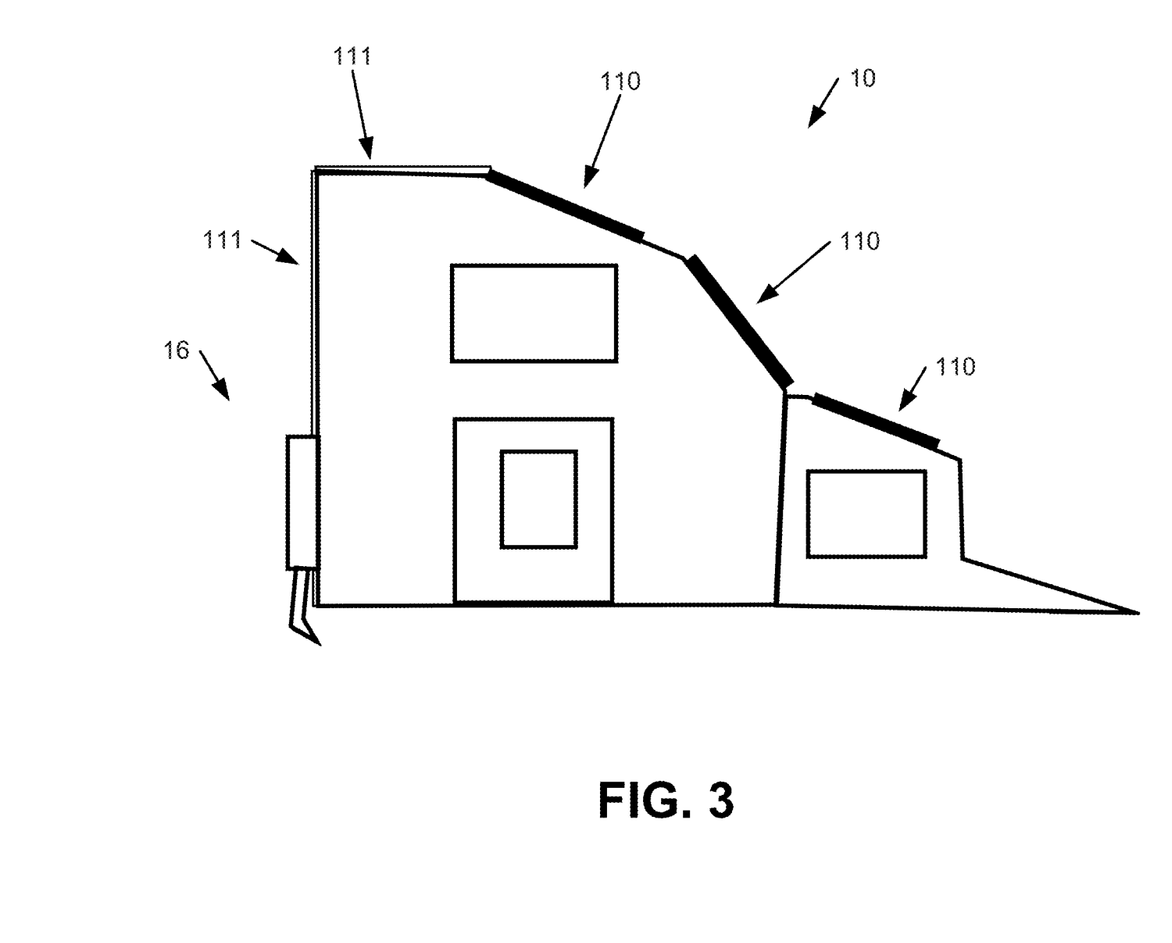
FIGS. 3-5 illustrate a side view, a top view, and a back view respectively of a truck having one or more solar panels and/or related components of the solar power system mounted to the truck according to the present disclosure.
Figure 4:
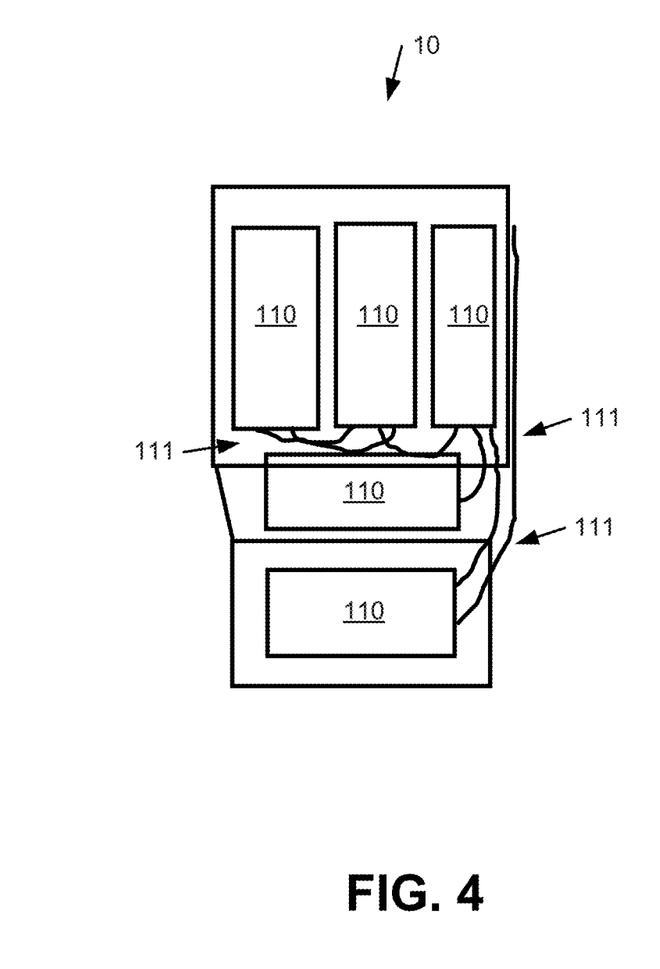
Figure 5:
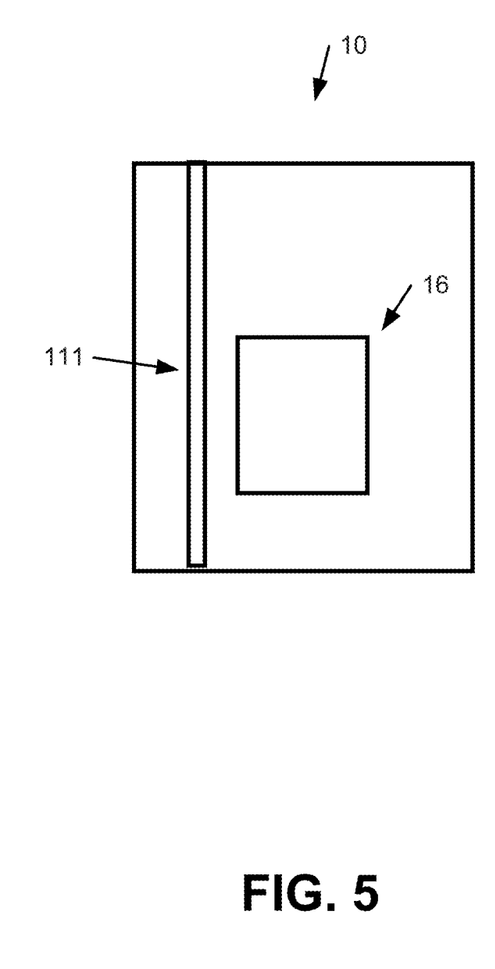

FIGS. 3-5 illustrate a side view, a top view, and a back view respectively of a truck 10 (e.g., the truck 10 of FIG. 1) having one or more solar panels 110 and/or related components of the solar power system 100 mounted to the truck 10 according to the present disclosure.

It will understood by one skilled in the art in light of the present disclosure that although the solar power system 100 is described herein with respect to use on a truck 10 (i.e., truck tractor or tractor), the solar power system 100 may be used on any other suitable vehicle, type of truck, etc. according to the present disclosure.

In some implementations, the one or more solar panels (solar power panels or "solar panels") 110 may comprise any suitable solar panel that can be mounted on a truck 10 and charge the battery bank 130 according to the present disclosure.

In some implementations, the solar panels 110 may comprise any suitable configuration (e.g., size, shape, etc.) such that the solar panels 110 can be mounted on a truck 10 and charge the battery bank 130 according to the present disclosure.

Figure 10:
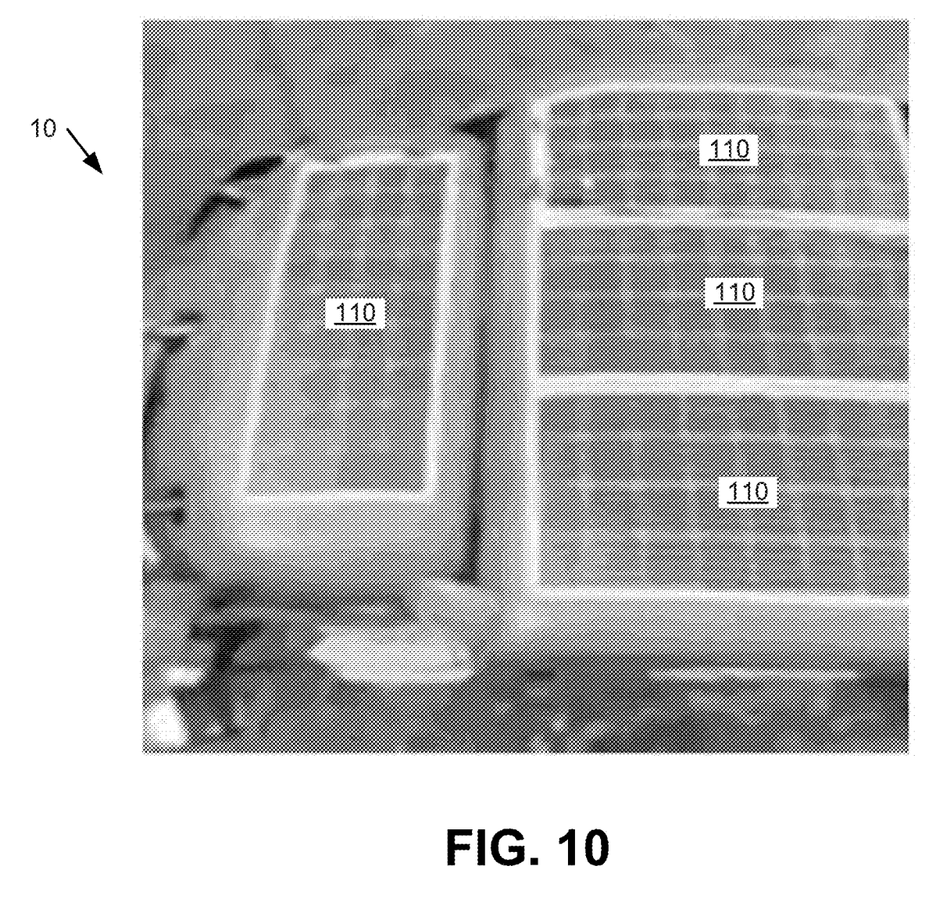
FIG. 10 illustrates another top view of a truck having one or more solar panels of the solar power system mounted to the truck according to the present disclosure.

In some implementations, the solar power system 100 may comprise four (as shown in FIG. 10) or five (as shown in FIG. 4) solar panels 110. In some implementations, the solar power system 100 may comprise more than five solar panels 110 or less than four solar panels 110. In some implementations, the solar panels connections are series parallel to increase voltage and amperage output to the solar controller 120. In some implementations, the voltage output is at least 30 volts. In some implementations, the voltage output is less than 30 volts. In some implementations, the voltage output is between 30-50 volts. In some implementations, the voltage output is about 40 volts. In some implementations, the voltage output is greater than 50 volts. In some implementations, the amperage output is at least 30 amps. In some implementations, the amperage output is less than 30 amps.

In some implementations, each solar panel 110 may comprise a 100 to 200 watts output capacity. In some implementations, each solar panel 110 may comprise an output capacity that is greater than 200 watts or an output capacity that is less than 100 watts.

In some implementations, the solar panels 110 may be flexible (e.g., physically flexible) power panels. That is, in some implementations, the solar panels 110 may be comprised of a fiberglass (or similar) material with photovoltaic cells embedded in the material. In some implementations, the material may further be covered by a resin coating.

In some implementations, the flexible solar panels 110 may be custom fitted to mount to the top (or any other suitable location) of a truck 10. For example, in some implementations, the flexible solar panels 110 may be custom fitted by using a laser measuring process of the mounting area on the truck 10. In this way, in some implementations, the custom fitted flexible solar panels 110 generally form a replica of the mounting area (e.g., the roofline) of the truck 10.

In some implementations, the custom fitted flexible solar panels 110 provide a more streamlined and aesthetically desirable configuration of the solar panels 110.

In some implementations, the flexible solar panels 110 that are custom fitted to mount on top of a truck 10 are referred to as a "cap" because of the cap/hat-like configuration on the truck 10. FIG. 10 may illustrate an example of a flexible solar panels cap 110 mounted on top a truck 10.

As shown in FIGS. 3 and 4, in some implementations, the solar panels 110 are mounted on top of the truck 10. In some implementations, the solar panels 110 may be mounted in any other suitable location on the truck 110.

In some implementations, the solar panels 110 provide an additional and/or alternate energy source to a truck 10 by the solar power system 100.

In some implementations, the solar panels 110 provides energy in the solar power system 100 to charge the battery bank 130 (e.g., via the solar controller 120). For example, in some implementations, the solar panels 110 provides energy to charge the battery bank 130 for night usage of the HVAC system and/or any other suitable component, amenity, etc. (such as lighting, communications, accessories, etc.) of the truck 10.

In some implementations, the solar panels 110 provides energy to charge the battery bank 130 for 12 hours of night usage of the HVAC system and/or any other suitable component, amenity, etc. of the truck 10. In some implementations, the solar panels 110 may provides energy to charge the battery bank 130 for more than 12 hours of night usage or for less than 12 hours of night usage.

As shown in FIG. 2, in some implementations, the solar panels 110 are operatively connected (e.g., electrically or otherwise suitably connected for the operation of the solar power system 100) to the solar controller 120 (e.g., to an input of the solar controller 120) such that solar generated energy can flow from the solar panels 110 to the solar controller 120. In some implementations, the solar panels 110 may be operatively connected in the solar power system 100 in any other suitable configuration.

FIG. 5 illustrates a back view of a truck 10 having one or more related components of the solar panels 110 of the solar power system 110 mounted to the truck 10 according to the present disclosure. For example, as shown in FIG. 5, in some implementations, one or more PV (photo-voltaic) or other suitable cables 111 may route adjacent to (e.g., near or next to) the A/C (air conditioning) condenser and fan assembly 16 of the truck 10 along the back exterior of the truck 10 from the solar panels 110 to other components of the solar power system 100, such as the solar controller 120.

FIGS. 3 and 4 also illustrate example routing of the PV cables 111 along the exterior of the truck 10 adjacent to the solar panels 110.

In some implementations, the cables 111 carry power from solar panels 110 to other components of the solar power system 100, such as the solar controller 120.

In some implementations, the solar controller 120 may be any suitable solar controller that can receive, control, and/or distribute inputs from the operatively connected energy sources of the solar power system 100, such as the solar panels 110 and the generator/alternator 160, to the battery bank 130 and/or other suitable component of the solar power system 100. For example, in some implementations, the solar controller 120 has DC/DC conversion with a bi-stable relay to isolate incoming voltage and amperage.

In some implementations, the solar controller 120 may comprise any suitable configuration (e.g., size, shape, etc.) such that the solar controller 120 can receive, control, and/or distribute inputs from the operatively connected energy sources of the solar power system 100 to the battery bank 130 and/or other suitable component of the solar power system 100.

Figure 8:
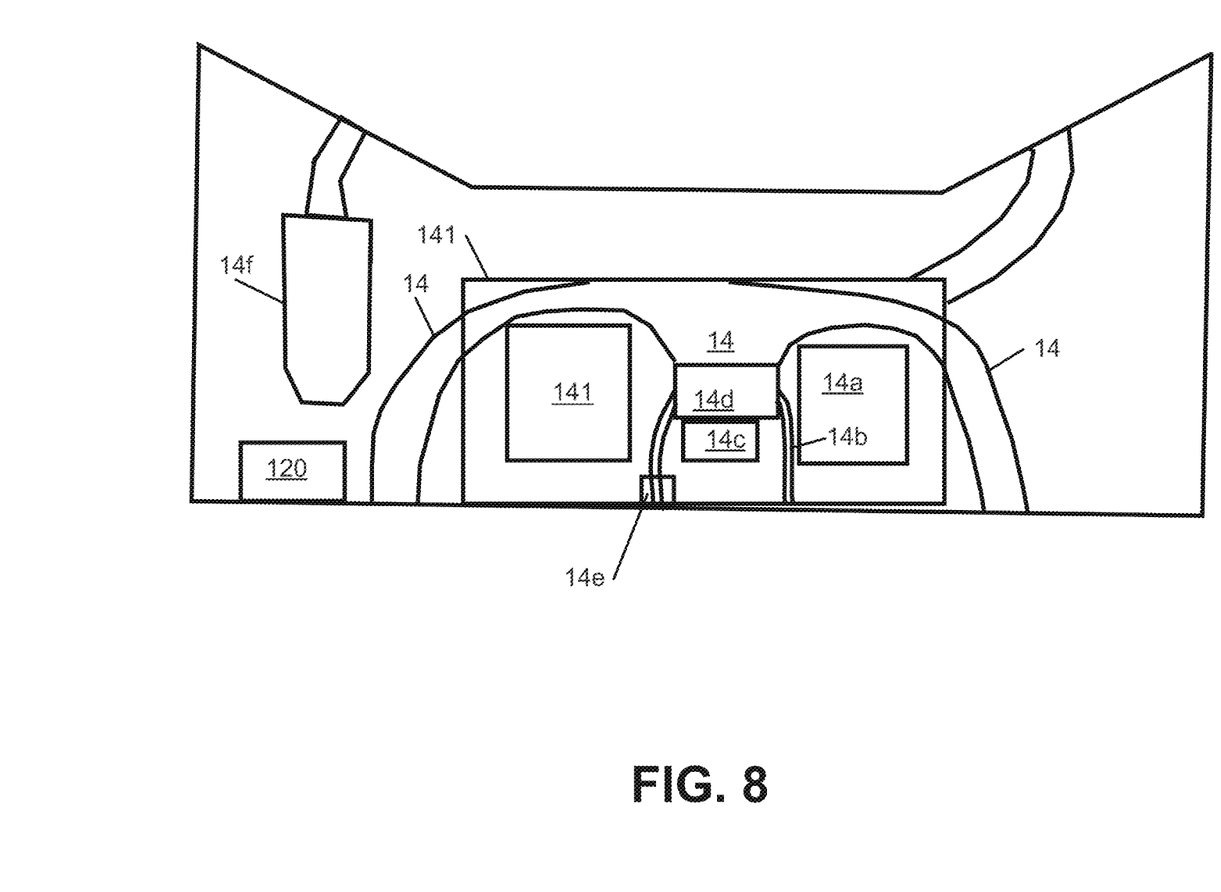
FIG. 8 illustrates an example mounting and interface configuration of the HVAC controller of the solar power system to the HVAC system of a truck according to the present disclosure.

In some implementations, the solar controller 120 may be mounted in any suitable location of the truck 10. For example, as shown in FIG. 8 (which is described further below regarding the HVAC controller 140), in some implementations, the solar controller 120 may be mounted (e.g., housed) in and/or adjacent to (e.g., near or next to) ducting 14 located under the bunk/bed in the cab/sleeper compartment 11 of the truck 10. In some implementations, the solar controller 120 may further be mounted adjacent to the diesel heater 14f under the bunk/bed in the cab/sleeper compartment 11.

In some implementations, the solar controller 120 is configured to receive, control, and/or distribute inputs from the operatively connected energy sources of the solar power system 100, such as the solar panels 110 and the generator/alternator 160, to the battery bank 130 and/or other suitable component of the solar power system 100. For example, in some implementations, the solar controller 120 is configured to receive, control, and/or distribute inputs from the operatively connected solar panels 110 to charge the battery bank 130.

In some implementations, the solar controller 120 is configured to provide the main control of energy flow through the solar power system 100.

As shown in FIG. 2, in some implementations, the solar controller 120 may comprise Bluetooth wireless technology 121 for transmitting system information such as the state of charge of battery bank 130 and/or the status of other components of the solar power system 100.

In some implementations, the battery bank 130 may be any suitable battery bank that can store energy received from the solar panels 110 and/or other suitable component of the solar power system 100, such as the generator/alternator 160.

In some implementations, the battery bank 130 may comprise any suitable configuration (e.g., size, shape, etc.) such that the battery bank 130 can store energy received from the solar panels 110 and/or other suitable component of the solar power system 100.

In some implementations, the battery bank 130 comprises lithium-ion (Li-ion) batteries. For example, in some implementations, the battery bank 130 may comprise Life P04 Group 31 batteries.

In some implementations, the battery bank 130 may comprise any other suitable batteries.

In some implementations, the battery bank 130 may comprise a 400 to 800 Ah (amp-hour) battery capacity. In some implementations, the battery bank 130 may comprise a battery capacity that is greater than 800 Ah or a battery capacity that is less than 400 Ah.

In some implementations, the battery bank 130 may comprise any suitable configuration of smaller batteries to provide a desired battery capacity. For example, in some implementations, the battery bank 130 may comprise four 100 Ah batteries connected in series to provide a 400 Ah battery capacity. In some implementations, the battery bank 130 may comprise four 200 Ah batteries connected in series to provide an 800 Ah battery capacity.

In some implementations, the battery bank 130 provides energy in the solar power system 100 to power the HVAC system of a truck 10 when the engine is not running (e.g., when the driver is resting or sleeping in the cab/sleeper compartment 11). In some implementations, the battery bank 130 provides energy in the solar power system 100 to further or alternately power any other suitable component, amenity, etc (such as lighting, communications, accessories, etc.) of a truck 10 when the engine is not running.

As shown in FIG. 2, in some implementations, the battery bank 130 is operatively connected to the solar controller 120 (e.g., to an output of the solar controller 120) such that energy from a power source connected to the solar controller 120 (such as the solar panels 110) can flow to the battery bank 130. In some implementations, the battery bank 130 may be operatively connected in the solar power system 100 in any other suitable configuration.

Figure 6:
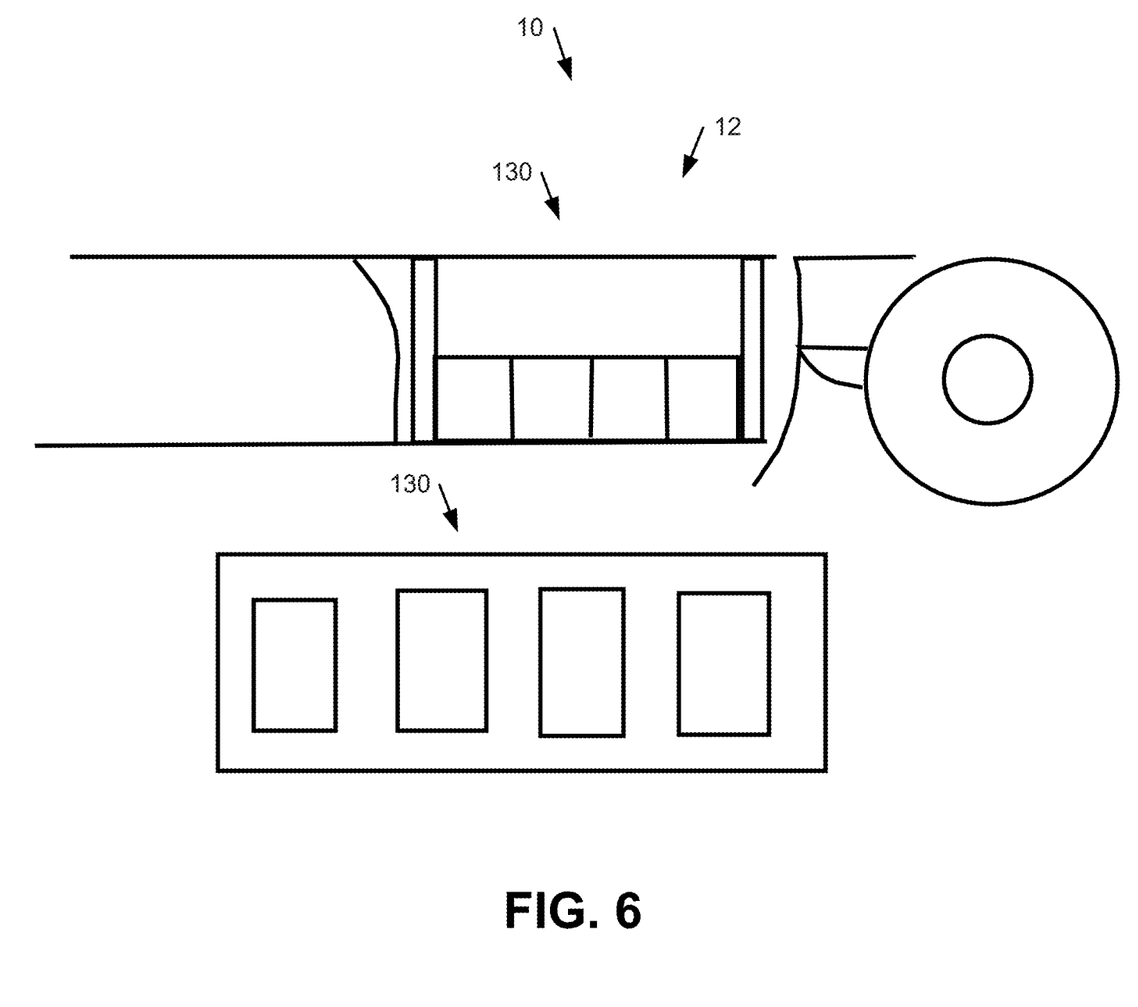
FIGS. 6 and 7 illustrate example mounting configurations of the battery bank of the solar power system to a truck according to the present disclosure.
Figure 7:
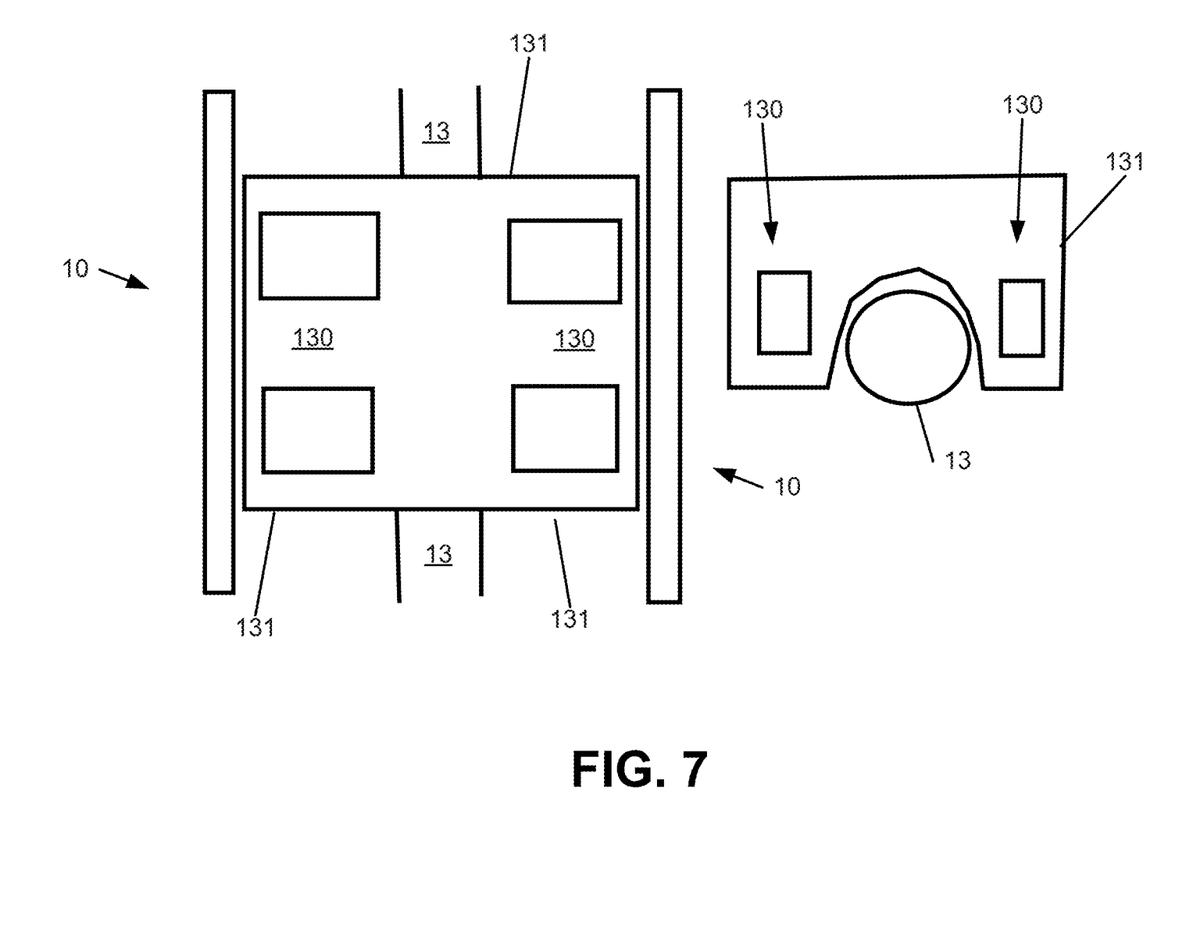

FIGS. 6 and 7 illustrate example mounting configurations of the battery bank 130 of the solar power system 100 to a truck 10 according to the present disclosure.

As shown in FIG. 6, in some implementations, the battery bank 130 may be mounted (e.g., housed) on a side door 12 of a truck 10. As shown in FIG. 7, in some implementations, the battery bank 130 may be housed in a box 131 mounted at the back of the truck 10 straddling over the drive shaft 13 of the truck 10.

In some implementations, the battery bank 130 may be mounted (e.g., housed) in any other suitable location of the truck 10.

FIG. 8 illustrates an example mounting and interface configuration of the HVAC controller 140 of the solar power system 100 to the HVAC system of a truck 10 according to the present disclosure.

In some implementations, the HVAC controller 140 may be any suitable HVAC controller that can control the interface of power supply and/or controls from the solar power system 100 to the truck HVAC system.

In some implementations, the HVAC controller 140 may comprise any suitable configuration (e.g., size, shape, etc.) such that the HVAC controller 140 can control the interface of power supply and/or controls from the solar power system 100 to the truck HVAC system.

As shown in FIG. 8, in some implementations, the HVAC controller 140 is mounted (e.g., housed) in and/or adjacent to (e.g., near or next to) ducting 14 located under the bunk/bed in the cab/sleeper compartment 11 of the truck 10. In some implementations, the HVAC controller 140 may be mounted in an HVAC controller box 141 in and/or adjacent to the ducting 14.

As shown in FIG. 8, in some implementations, the HVAC controller 140 is further mounted adjacent to (e.g., near or next to) an amplifier compressor box 14a of the truck 10 HVAC system. In some implementations, the HVAC controller 140 is further mounted adjacent to A/C (air conditioning) lines 14b from the condenser of the truck 10 HVAC system.

As shown in FIG. 8, in some implementations, the HVAC controller 140 is further mounted adjacent to a blower motor 14c of the truck 10 HVAC system. In some implementations, according to the present disclosure, the blower motor 14c may be amplified to 48 volts by the amplifier 14a. In this way, in some implementations, the blower motor 14c (and/or other components of the truck 10) may be amplified to use lower amperage at a higher voltage to conserve the charge of battery bank 130 during use of the solar power system 100. In some implementations, according to the present disclosure, the blower motor 14c may be amplified to at least 48 volts by the amplifier 14a. In some implementations, according to the present disclosure, the blower motor 14c may be amplified to a voltage greater than 12 volts and less than 48 volts by the amplifier 14a.

As shown in FIG. 8, in some implementations, the HVAC controller 140 is further mounted adjacent to an evaporator core 14d of the truck 10 HVAC system. In some implementations, the HVAC controller 140 is further mounted adjacent to a thermal expansion valve 14e of the truck 10 HVAC system.

As shown in FIG. 8, in some implementations, the HVAC controller 140 is further mounted adjacent to a diesel heater 14f of the truck 10 HVAC system.

As shown in FIG. 2, in some implementations, the HVAC controller 140 is operatively connected to the battery bank 130 (e.g., to an output of the battery bank 130) such that energy from the battery bank 130 can flow to the HVAC controller 140 to power the truck 10 HVAC system. In some implementations, the HVAC controller 140 may be operatively connected in the solar power system 100 in any other suitable configuration.

In some implementations, the solar power system 100 does not include an inverter to provide AC (alternating current) power from the solar power system 100. However, as discussed above and shown in FIG. 2, in some implementations, the solar power system 100 may further comprise an inverter 150.

Although one skilled in the art will understand in light of the present disclosure that the electrical power and related features described herein concern DC (direct current) electrical power, e.g. in compatibility with the power usage of a truck 10, one skilled in the art will further understand in light of the present disclosure that the electrical power and related features described herein may concern any other suitable type, form, etc. of electrical power, such as AC (alternating current) power.

In some implementations, the inverter 150 may be any suitable inverter that can convert DC power from the battery bank 130 (or other suitable component of the solar power system 100) to AC (alternating current) power for use by any suitable components of or otherwise related to the truck 10, such as lighting, communications, accessories, etc.

In some implementations, the inverter 150 may comprise any suitable configuration (e.g., size, shape, etc.) such that the inverter 150 can convert DC power from the battery bank 130 (or other suitable component of the solar power system 100) to AC power for use by any suitable components of or otherwise related to the truck 10.

In some implementations, the inverter 150 may be mounted (e.g., housed) at any suitable location with respect to the solar power system 100, such as adjacent to the solar panels 110, the battery bank 130, or the HVAC controller 140. In some implementations, the inverter 150 may be mounted at any other suitable location of the truck 10, such as in the truck 10 engine compartment.

As shown in FIG. 2, in some implementations, the inverter 150 is operatively connected to the battery bank 130 of the solar power system 100 (e.g., to an output of the battery bank 130) such that the inverter 150 can convert DC power from the battery bank 130 to AC power for use by any suitable components of or otherwise related to the truck 10. In some implementations, the inverter 150 may be operatively connected in the solar power system 100 in any other suitable configuration.

In some implementations, the solar power system 100 does not include a generator/alternator to provide backup power to the solar power system 100. However, as discussed above and shown in FIG. 2, in some implementations, the solar power system 100 may further comprise a generator/alternator (or "generator") 160.

In some implementations, the generator 160 may be any suitable generator, alternator, etc. that can provide backup power in the solar power system 100 (e.g., in backup to the solar panels 110).

In some implementations, the generator 160 may comprise any suitable configuration (e.g., size, shape, etc.) such that the generator 160 can provide backup power in the solar power system 100.

In some implementations, the generator 160 may be mounted (e.g., housed) at any suitable location of the truck 10, such as in the truck 10 engine compartment or otherwise adjacent to a mechanical energy source to operate the generator 160.

As shown in FIG. 2, in some implementations, the generator 160 is operatively connected to the solar controller 120 of the solar power system 100 (e.g., to an input of the solar controller 120) such that the generator 160 can provide backup power in the solar power system 100. In some implementations, the generator 160 may be operatively connected in the solar power system 100 in any other suitable configuration.

In some implementations, the generator/alternator 160 can provide backup power in the solar power system 100 if the solar panels 110 are inoperable or otherwise unavailable to provide power in the solar power system 100. In some implementations, the generator/alternator 160 can provide backup power in the solar power system 100 for any other suitable situation, need, etc.

FIG. 9 illustrates an implementation of an example venting system 170 of the solar power system 100 according to the present disclosure. As discussed above and shown in FIG. 9, in some implementations, the solar power system 100 may further comprise the venting system 170.

In some implementations, the venting system 170 may be any suitable venting system 170 that can distribute heating, cooling, and/or ventilation (e.g., by air) within the cab/sleeper compartment 11 of the truck 10 to control the climate in the cab/sleeper compartment 11.

In some implementations, the venting system 170 may comprise any suitable configuration (e.g., size, shape, etc.) such that the venting system 170 can distribute heating, cooling, and/or ventilation within the cab/sleeper compartment 11 of the truck 10 to control the climate in the cab/sleeper compartment 11.

In some implementations, FIG. 9 illustrates the venting system 170 mounted on and/or behind the interior back wall of a cab/sleeper compartment 11 of a truck 10.

As shown in FIG. 9, in some implementations, the venting system comprises an A/C (air conditioning) outlet/duct 171 and a heater outlet/ducting 172.

In some implementations, the A/C outlet 171 and the heater outlet 172 are located on the floor of a truck 10. For example, as shown in FIG. 9, in some implementations, the A/C outlet 171 and the heater outlet 172 may be positioned under and/or otherwise adjacent to (e.g., near or next to) the bunk/bed 15 in the cab/sleeper compartment 11 of the truck 10. In some implementations, the A/C outlet 171 and the heater outlet 172 may be additionally and/or alternately positioned on, under, or otherwise adjacent to the floor of the cab/sleeper compartment 11.

In some implementations, the A/C outlet 171 is operatively connected (e.g., mechanically or otherwise suitably connected for the operation of the solar power system 100) to piping 173 running up the sidewalls of the truck 10 in the cab/sleeper compartment 11. In some implementations, the piping 173 comprises vents 174 for distributing cool air from the A/C outlet 171.

In some implementations, the heater outlet 172 on the floor (and/or under the bunk 15) outputs heat. In some implementations, the heat rises from the heater outlet 172 in the cab/sleeper compartment 11 of the truck 10 to heat the cab/sleeper compartment 11.

In some implementations, the venting system 170 may be mounted (e.g., housed) at any suitable location of the truck 10, such as on and/or behind the interior back wall of a cab/sleeper compartment 11 of a truck 10 as shown in FIG. 9.

In some implementations, the venting system 170 is configured to distribute heating, cooling, and/or ventilation (e.g., by air) within the cab/sleeper compartment 11 of the truck 10 to control the climate in the cab/sleeper compartment 11.

In some implementations, the venting system 170 is interfaced with the solar power system 100 via the HVAC controller 140, which is interfaced with the truck 10 HVAC system as described above.

In some implementations, the venting system 170 is operatively connected to the truck 10 HVAC system such that the venting system 170 can distribute heating, cooling, and/or ventilation within the cab/sleeper compartment 11 of the truck 10 to control the climate in the cab/sleeper compartment 11. In some implementations, the venting system 170 may be operatively connected in any other suitable configuration.

FIG. 10 illustrates another top view of a truck 10 having one or more solar panels 110 of the solar power system 100 mounted to the truck 10 according to the present disclosure. FIG. 10 may illustrate an example of a flexible solar panels cap 110 mounted on top a truck 10, as described above.

As described above, in some implementations of the solar power system 100, the solar panels (e.g., flexible power panels) 110 of the solar power system 100 are mounted to the roof (or other suitable location) of a truck 10 and operatively connected (e.g., electrically or otherwise suitably connected for the operation of the solar power system 100) to the solar controller 120, which is operatively connected to the battery bank 130 (e.g., comprising lithium-ion batteries), which is operatively connected to the HVAC (heating, ventilation, and air conditioning) controller 140 to power the truck 10 HVAC system.

In some implementations, the solar power system 100 provides for heating and/or cooling a cab/sleeper compartment 11 of a truck 10 without using the engine to power a heating or HVAC (heating, ventilation, and air conditioning) system.

In some implementations, the solar power system 100 further provides power for any other suitable component, amenity, etc. of the truck 10 (such as lighting, communications, accessories, etc. in addition to the HVAC system, i.e. the electrical load of the truck 10) without using the engine to power these components.

In some implementations, the solar power system 100 helps to eliminate engine idle time (i.e., time the truck 10 is not moving but the engine is running) while providing climate control to the cab/sleeper compartment 11 for keeping the truck 10 driver/passenger comfortable.

In some implementations, the solar power system 100 helps to eliminate engine idle time while further providing power for any other suitable component, amenity, etc. of the truck 10 (such as lighting, communications, accessories, etc. in addition to the HVAC system, i.e. the electrical load of the truck 10).

In some implementations, the elimination of the overall engine idle time of the truck 10 provided by the solar power system 100 reduces fuel usage, engine wear, and/or $CO_2$ (carbon dioxide) emissions of the truck 10, among other advantages/benefits.

In some implementations, the solar power system 100 is configured such that the truck 10 engine is not needed to charge the battery bank 130 and the battery bank 130 is capable of providing power for approximately 12 hours (e.g., as much or longer than a typical rest/sleep period). In some implementations, the battery bank may be capable of providing power for more than 12 hours or for less than 12 hours.

In some implementations, the solar power system 100 is further configured such that the solar panels 110 can power the truck 10 HVAC system during the day, daylight hours, etc. while charging the battery bank 130 and the battery bank 130 can then be used (e.g., at night) for approximately 12 hours (e.g., as much or longer than a typical rest/sleep period) to provide power for any other suitable component, amenity, etc. of the truck 10 (such as lighting, communications, accessories, etc. in addition to the HVAC system, i.e. the electrical load of the truck 10). In some implementations, the battery bank 130 can be used for more than 12 hours or for less than 12 hours.

In some implementations, the solar power system 100 is configured such that the solar panels 110 can power the truck 10 HVAC system instead of the battery bank 130 during the day, daylight hours, etc. while charging the battery bank 130. In some implementations, the solar power system 100 is configured such that the solar panels 110 can power all electrical systems of the truck 10 including the HVAC system instead of the battery bank 130 during the day, daylight hours, etc. while charging the battery bank 130.

In some implementations, the solar power system 100 is configured to use fewer batteries for a longer period of time than prior art systems.

In some implementations, the solar power system 100 may be configured to increase the voltage of power provided for high load components such as the compressor, condenser fan, evaporator fan, etc of the truck 10. For example, in some implementations, the solar power system 100 may be configured to increase/amplify the voltage from 12 volts to 48 volts. In some implementations, the solar power system 100 may be configured to increase/amplify the voltage from 12 volts to less than 48 volts. In some implementations, the solar power system 100 may be configured to increase/amplify the voltage from 12 volts to greater than 48 volts.

In some implementations, the solar power system 100 may be configured to increase the voltage of power (such as described above) with a suitable amplifier and/or transformer.

In some implementations, the solar power system 100 may be configured to use reduced amperage, for example by using increased/amplified voltage for components of the truck 10 (such as described above).

In some implementations, the increased voltage is used to power a HVAC system of the truck. In some implementations, the increased voltage is used to power an auxiliary HVAC system of the truck. In some implementations, the auxiliary HVAC system is separate from the truck's factory installed HVAC system. In some implementations, the auxiliary HVAC system is configured to operate on an increased voltage. In this way, the amperage that the system consumes is reduced and extends the overall battery life to ensure operation of the system to the specified timeframe.

In some implementations, the solar power system 100 is portable.

In some implementations, the solar power system 100 is separable from the truck 10 or from systems of the truck 10.

In some implementations, the solar power system 100 is isolated from the truck 10.

In some implementations, the solar power system 100 can be used with or retrofitted to any truck 10.

In some implementations, the solar power system 100 does not include/require an auto-start system of a truck 10 for automatically starting the truck 10 based on the state of charge of the battery bank 110, such as a low charge while powering the HVAC system of the truck 10.

In some implementations, the solar power system 100 is uncoupled from the auto-start system of a truck 10.

As stated above, although one skilled in the art will understand in light of the present disclosure that the electrical power and related features described herein are regarding DC (direct current) electrical power, e.g. in compatibility with the power usage of a truck 10, one skilled in the art will further understand in light of the present disclosure that the electrical power and related features described herein may regard any other suitable type, form, etc. of electrical power, such as AC (alternating current) power.

As also stated above, it will understood by one skilled in the art in light of the present disclosure that although the solar power system 100 is described herein with respect to use on a truck 10 (i.e., truck tractor or tractor), the solar power system 100 may be used on any other suitable vehicle, type of truck, etc. according to the present disclosure.

In some implementations, the solar power system 100 comprises any suitable dimensions.

In some implementations, the solar power system 100 is composed of any suitable materials, such as the example materials described above.

In some implementations, the solar power system 100 can have any suitable appearance, such as shown in the figures.

In some implementations, an example method of using the solar power system 100, with respect to the above-described figures, comprises charging the battery bank 130 of the solar power system 100 with the solar panels 110 of the solar power system 100 mounted on top of a truck 10 for night usage (or usage at any other suitable time) of the truck 10 HVAC system to provide climate control to the truck 10 cab/sleeper compartment 11 without running the truck 10 engine for power (thereby eliminating engine idle time while using the truck 10 HVAC system). In some implementations, the battery bank 130 is used to power the truck 10 HVAC system when the truck 10 engine is not running (e.g., when the driver is sleeping in the cab/sleeper compartment 11).

In some implementations, another example method of using the solar power system 100, with respect to the above-described figures, comprises mounting the solar panels 110 on top (e.g., on the roof as shown in FIGS. 3, 4, and 10, or any other suitable location) of a truck 10. In some implementations, the method comprises mounting (e.g., housing) the battery bank 130 on a side door 12 of the truck 10 or in a box 131 mounted at the back of the truck 10 straddling over the drive shaft 13 of the truck 10, such as shown in FIGS. 6 and 7 respectively.

In some implementations, the method comprises mounting (e.g., housing) the HVAC controller 140 in and/or adjacent to (e.g., near or next to) ducting 14 located under the bunk/bed in the cab/sleeper compartment 11 of the truck 10, such as shown in FIG. 8. In some implementations, the HVAC controller 140 may be mounted in an HVAC controller box 141 in and/or adjacent to the ducting 14.

In some implementations, the method comprises mounting (e.g., housing) the solar controller 120 at any suitable location with respect to the solar power system 100, such as in and/or adjacent to (e.g., near or next to) ducting 14 located under the bunk/bed in the cab/sleeper compartment 11 of the truck 10 as shown in FIG. 8. In some implementations, the solar controller 120 may be mounted at any other suitable location of the truck 10, such as adjacent to the solar panels 110, the battery bank 130, or the HVAC controller 140.

In some implementations, the method comprises operatively connecting (e.g., electrically or otherwise suitably connecting for the operation of the solar power system 100) the solar panels 110 to the solar controller 120 of the solar power system 100 (e.g., to an input of the solar controller 120) such that solar generated energy can flow from the solar panels 110 to the solar controller 120, such as shown in FIG. 2.

In some implementations, the method comprises operatively connecting the battery bank 130 to the solar controller 120 of the solar power system 100 (e.g., to an output of the solar controller 120) such that energy from a power source connected to the solar controller 120 (such as the solar panels 110) can flow to the battery bank 130, such as shown in FIG. 2.

In some implementations, the method comprises operatively connecting the HVAC controller 140 to the battery bank 130 of the solar power system 100 (e.g., to an output of the battery bank 130) such that energy from the battery bank 130 can flow to the HVAC controller 140 to power the truck 10 HVAC system, such as shown in FIG. 2.

In some implementations, the method may further comprise mounting (e.g., housing) the inverter 150 at any suitable location with respect to the solar power system 100, such as adjacent to the solar panels 110, the battery bank 130, or the HVAC controller 140. In some implementations, the inverter 150 may be mounted at any other suitable location of the truck 10, such as in the truck 10 engine compartment.

In some implementations, the method may further comprise operatively connecting the inverter 150 to the battery bank 130 of the solar power system 100 (e.g., to an output of the battery bank 130) such that the inverter 150 can convert DC power from the battery bank 130 to AC power for use by any suitable components of or otherwise related to the truck 10, such as shown in FIG. 2.

In some implementations, the method may further comprise mounting (e.g., housing) the generator/alternator 160 at any suitable location of the truck 10, such as in the truck 10 engine compartment or otherwise adjacent to a mechanical energy source to operate the generator/alternator 160.

In some implementations, the method may further comprise operatively connecting the generator/alternator 160 to the solar controller 120 of the solar power system 100 (e.g., to an input of the solar controller 120) such that the generator/alternator 160 can provide backup power in the solar power system 100, such as shown in FIG. 2.

In some implementations, the method may further comprise mounting the venting system 170 at any suitable location of the truck 10, such as on and/or behind the interior back wall of the cab/sleeper compartment 11 of the truck 10.

In some implementations, the method may further comprise operatively connecting the venting system 170 to the truck 10 HVAC system such that the venting system 170 can distribute heating, cooling, and/or ventilation within the cab/sleeper compartment 11 of the truck 10 to control the climate in the cab/sleeper compartment 11.

In some implementations, another example method of using the solar power system 100, with respect to the above-described figures, comprises generating solar energy with the solar panels 110 of the solar power system 100 that flows from the solar panels 110 to the solar controller 120.

In some implementations, the method comprises directing the solar energy generated from the solar panels 110 to the battery bank 130 of the solar power system 100 with the solar controller 120 of the solar power system 100 to charge the battery bank 130.

In some implementations, the method comprises providing energy stored in the battery bank 130 of the solar power system 100 to the HVAC controller 140 for powering the truck 10 HVAC system.

In some implementations, the method comprises providing energy to the truck 10 HVAC system with the HVAC controller 140 of the solar power system 100 to power the truck 10 HVAC system.

In some implementations, the method may further comprise converting DC power from the battery bank 130 to AC power with the inverter 150 of the solar power system 100 for use by any suitable components of or otherwise related to the truck 10.

In some implementations, the method may further comprise providing backup power in the solar power system 100 with the generator/alternator 160 of the solar power system 100, such as if the solar panels 110 are inoperable or otherwise unavailable to provide power in the solar power system 100.

In some implementations, the method may further comprise distributing heating, cooling, and/or ventilation within the cab/sleeper compartment 11 of the truck 10 with the venting system 170 of the solar power system 100 to control the climate in the cab/sleeper compartment 11.

The figures, including photographs and drawings, comprised herewith may represent one or more implementations of the solar power system.

Details shown in the figures, such as dimensions, descriptions, etc., are exemplary, and there may be implementations of other suitable details according to the present disclosure.

Reference throughout this specification to "an embodiment" or "implementation" or words of similar import means that a particular described feature, structure, or characteristic is comprised in at least one embodiment of the present invention. Thus, the phrase "in some implementations" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

While operations may be depicted in the drawings in a particular order, this should not be understood as requiring that such operations be performed in the particular order shown or in sequential order, or that all illustrated operations be performed, to achieve desirable results.

The invention claimed is:

1. A truck solar power system comprising:
one or more solar panels, a solar controller, a battery bank, and an HVAC controller, wherein:
the solar panels are operatively connected to the solar controller, the solar controller is operatively connected to the battery bank, and the battery bank is operatively connected to the HVAC controller such that the solar controller can control the energy generated by the solar panels to charge the battery bank and the HVAC controller can control the energy stored in the battery bank to power a HVAC system of a truck of a tractor trailer;
the solar panels are configured to generate energy such that the solar panels can charge the battery bank such that the battery bank can power the HVAC system of a truck of a tractor trailer for at least 12 continuous hours without using the engine of the truck to power the HVAC system; and
the battery bank is configured such that the battery bank can store energy generated by the solar panels such that the stored energy can power the HVAC system of a truck of a tractor trailer for at least 12 continuous hours without using the engine of the truck to power the HVAC system.

2. The truck solar power system of claim 1 wherein the battery bank comprises lithium-ion batteries.

3. The truck solar power system of claim 1 wherein:
the solar panels comprise up to four 100 watt solar panels; and
the battery bank comprises up to four 100 Ah lithium-ion batteries connected together to provide a 400 Ah battery capacity.

4. The truck solar power system of claim 1 wherein:
the solar panels are configured to generate energy such that the solar panels can charge the battery bank such that the battery bank can power the electrical load of a truck of a tractor trailer including the HVAC system for at least 12 continuous hours without using the engine of the truck to power the electrical load; and
the battery bank is configured such that the battery bank can store energy generated by the solar panels such that the stored energy can power the electrical load of a truck of a tractor trailer including the HVAC system for at least 12 continuous hours without using the engine of the truck to power the electrical load.

5. The truck solar power system of claim 4 wherein:
the solar panels comprise up to four 200 watt solar panels; and
the battery bank comprises up to four 200 Ah lithium-ion batteries connected together to provide an 800 Ah battery capacity.

6. The truck solar power system of claim 1 wherein the solar panels are mounted on the roof of a truck of a tractor trailer.

7. The truck solar power system of claim 1 wherein the solar panels are physically flexible solar power panels.

8. The truck solar power system of claim 7 wherein the solar panels comprise a physically flexible fiberglass material embedded with photovoltaic cells.

9. The truck solar power system of claim 1 wherein the battery bank is mounted on a side door of a truck of a tractor trailer.

10. The truck solar power system of claim 1 wherein the battery bank is mounted at the rear of a truck of a tractor trailer positioned over the drive shaft of the truck.

11. The truck solar power system of claim 1 further comprising an inverter, wherein the inverter is operatively connected to the battery bank such that the energy stored in the battery bank can power the AC electrical load of a truck of a tractor trailer without using the engine of the truck to power the AC electrical load.

12. The truck solar power system of claim 1 further comprising a generator wherein:
the generator is operatively connected to the solar controller such that the solar controller can control the energy generated by the generator to charge the battery bank; and
the generator is configured to generate energy to charge the battery bank as a backup to the solar panels.

13. The truck solar power system of claim 1 further comprising a venting system wherein:
the venting system comprises an A/C outlet and a heater outlet positioned on the floor of the cab/sleeper compartment of a truck of a tractor trailer, wherein:
the A/C outlet is operatively connected to piping running up the sidewalls of the cab/sleeper compartment having vents that can distribute cool air from the A/C outlet; and
the heater outlet can output heat that rises in and heats the cab/sleeper compartment; and
the venting system is operatively connected to the HVAC system of the truck such that the venting system can distribute heating, cooling, or ventilation within the cab/sleeper compartment of the truck to control the climate in the cab/sleeper compartment.

14. The truck solar power system of claim 1 wherein:
the solar power system does not comprise an auto-start system of a truck of a tractor trailer that automatically starts the engine of the truck due to a low charge status of the battery bank while the battery bank is powering the HVAC system of the truck; and
the solar power system is not coupled to an auto-start system of a truck of a tractor trailer.

15. The truck solar power system of claim 1 further comprising an amplifier that increases the voltage and lowers the amperage of stored energy from the battery bank that powers the HVAC system of a truck of a tractor trailer.

16. A method of using the truck solar power system of claim 1 comprising:
charging the battery bank with energy generated by the solar panels during daylight hours; and
powering the HVAC system of a truck of a tractor trailer for at least 12 continuous hours with stored energy from the battery bank without using the engine of the truck to power the HVAC system.

17. A method of using the truck solar power system of claim 4 comprising:

charging the battery bank with energy generated by the solar panels during daylight hours; and powering the electrical load of a truck of a tractor trailer including the HVAC system for at least 12 continuous hours with stored energy from the battery bank without using the engine of the truck to power the electrical load.

18. A truck solar power system comprising:

one or more solar panels, a solar controller, a battery bank, an amplifier, an HVAC controller, and a venting system wherein:

the solar panels are operatively connected to the solar controller, the solar controller is operatively connected to the battery bank, and the battery bank is operatively connected to the HVAC controller such that the solar controller can control the energy generated by the solar panels to charge the battery bank and the HVAC controller can control the energy stored in the battery bank to power a HVAC system of a truck of a tractor trailer;

the solar panels are configured to generate energy such that the solar panels can charge the battery bank such that the battery bank can power the HVAC system of a truck of a tractor trailer for at least 12 continuous hours without using the engine of the truck to power the HVAC system;

the battery bank is configured such that the battery bank can store energy generated by the solar panels such that the stored energy can power the HVAC system of a truck of a tractor trailer for at least 12 continuous hours without using the engine of the truck to power the HVAC system;

the battery bank comprises lithium-ion batteries;

the amplifier is configured to increase the voltage output of the stored energy from the battery bank to at least 48 volts to operate the venting system;

the solar power system does not comprise an auto-start system of a truck of a tractor trailer that automatically starts the engine of the truck due to a low charge status of the battery bank while the battery bank is powering the HVAC system of the truck and the solar power system is not coupled to an auto-start system of a truck of a tractor trailer; and the venting system comprises an A/C outlet, a heater outlet, and piping having vents wherein the piping is positioned along at least one sidewall of the of the cab/sleeper compartment and the A/C outlet is operatively connected to the piping to distribute cool air, wherein the venting system is operatively connected to the HVAC system of the truck to control the climate in the cab/sleeper compartment.

19. A method of using the truck solar power system of claim 18 comprising:

charging the battery bank with energy generated by the solar panels during daylight hours;

during the daylight hours, using energy generated from the solar panels instead the battery bank to power the HVAC system of a truck of a tractor trailer;

powering a truck of a tractor trailer for at least 12 continuous hours with stored energy from the battery bank without using the engine of the truck and while the engine is off; and keeping the engine off for at least 12 continuous hours while powering the truck of the tractor trailer with the stored energy from the battery bank; and controlling the climate in the cab/sleeper compartment using the venting system.

20. A method of using the truck solar power system of claim 4 comprising:

charging the battery bank with energy generated by the solar panels during daylight hours;

during the daylight hours, using energy generated from the solar panels instead the battery bank to power the HVAC system of a truck of a tractor trailer;

powering a truck of a tractor trailer for at least 12 continuous hours with stored energy from the battery bank without using the engine of the truck and while the engine is off; and keeping the engine off for at least 12 continuous hours while powering the truck of the tractor trailer with the stored energy from the battery bank.

* * * * *